(12) United States Patent
Ishida et al.

(10) Patent No.: US 12,270,570 B2
(45) Date of Patent: Apr. 8, 2025

(54) AIR CONDITIONER FOR PAINT BOOTH

(71) Applicant: Taikisha Ltd., Tokyo (JP)

(72) Inventors: Kozo Ishida, Tokyo (JP); Hiromitsu Nie, Kariya (JP); Koji Sakoda, Kariya (JP)

(73) Assignee: Taikisha Ltd., Tokyo (JP)

( * ) Notice: Subject to any disclaimer, the term of this patent is extended or adjusted under 35 U.S.C. 154(b) by 559 days.

(21) Appl. No.: 17/272,480

(22) PCT Filed: Jul. 28, 2020

(86) PCT No.: PCT/JP2020/028873
§ 371 (c)(1),
(2) Date: Mar. 1, 2021

(87) PCT Pub. No.: WO2021/024857
PCT Pub. Date: Feb. 11, 2021

(65) Prior Publication Data
US 2021/0325059 A1     Oct. 21, 2021

(30) Foreign Application Priority Data

Aug. 5, 2019 (JP) ................... 2019-143733

(51) Int. Cl.
*F24F 6/14*       (2006.01)
*B05B 16/40*      (2018.01)
(Continued)

(52) U.S. Cl.
CPC ............... *F24F 6/14* (2013.01); *B05B 16/40* (2018.02); *B05B 16/60* (2018.02); *F24F 3/147* (2013.01)

(58) Field of Classification Search
CPC .... F24F 6/14; F24F 3/147; F24F 3/044; F24F 2006/146; F24F 3/14; F24F 3/153;
(Continued)

(56) References Cited

U.S. PATENT DOCUMENTS 813,217 A * 2/1906 Kinealy ............... B01D 53/504
55/444
2,120,299 A * 6/1938 Stramaglia ............ F24F 5/0007
62/317
(Continued)

FOREIGN PATENT DOCUMENTS

CN         200952794 Y      9/2007
CN         105772309 A *    7/2016
(Continued)

*Primary Examiner* — Stephen Hobson
(74) *Attorney, Agent, or Firm* — The Webb Law Firm

(57) ABSTRACT

An air conditioner that can have a higher efficiency, a lower power consumption, and a smaller size is disclosed. The air conditioner is for supplying air to a paint booth for painting a paint target. The air conditioner includes a housing that has an inlet and an outlet for air that is to be supplied, a humidifying means for spraying humidifying mist into the air taken in through the inlet, and a vaporizing means for vaporizing unvaporized humidifying mist contained in the air into which the humidifying mist was sprayed by the humidifying means, by causing the unvaporized humidifying mist to come into contact with the air flowing through the vaporizing means. The air subjected to humidity adjustment by the humidifying means and the vaporizing means is supplied to the paint booth via the outlet.

11 Claims, 2 Drawing Sheets

(51) Int. Cl.
  *B05B 16/60* (2018.01)
  *F24F 3/147* (2006.01)
(58) Field of Classification Search
  CPC . F24F 6/04; B05B 16/40; B05B 16/60; B05B 7/0075; B05B 14/43; B05B 1/205; B05B 9/0423; B05B 13/0431; B05B 17/06; Y02B 30/54
  See application file for complete search history.

(56) References Cited

U.S. PATENT DOCUMENTS

| | | | | |
|---|---|---|---|---|
| 2,144,693 | A * | 1/1939 | Seid | F24F 3/14 236/44 C |
| 2,153,267 | A * | 4/1939 | Morse | F24F 6/04 96/357 |
| 2,387,473 | A * | 10/1945 | Spitzka | F24F 5/0035 55/467 |
| 3,338,035 | A * | 8/1967 | Dinkelacker | B01D 45/08 55/440 |
| 3,813,855 | A * | 6/1974 | Hill | B01D 45/08 55/440 |
| 3,870,488 | A * | 3/1975 | Arndt | B01D 45/08 55/440 |
| 3,963,464 | A * | 6/1976 | Schinner | F28C 3/06 210/310 |
| 4,494,596 | A * | 1/1985 | Bradshaw | F24F 3/14 261/153 |
| 4,537,120 | A * | 8/1985 | Josefsson | B05B 16/60 454/52 |
| 4,618,462 | A * | 10/1986 | Fisher | G01N 33/0006 261/DIG. 65 |
| 4,627,568 | A * | 12/1986 | Lortie | F24F 11/30 165/230 |
| 4,695,297 | A * | 9/1987 | Hein | B03C 3/363 96/32 |
| 4,750,545 | A * | 6/1988 | Hile | G05D 27/02 236/44 C |
| 5,127,574 | A * | 7/1992 | Mosser | B05B 16/60 454/52 |
| 5,425,902 | A * | 6/1995 | Miller | F24F 11/62 261/130 |
| 5,531,800 | A * | 7/1996 | Sewell | B01D 50/10 96/240 |
| 5,620,503 | A * | 4/1997 | Miller | F24F 6/14 261/98 |
| 5,697,403 | A * | 12/1997 | Onishi | F15D 1/00 138/45 |
| 5,709,038 | A * | 1/1998 | Scheufler | B01D 50/00 34/271 |
| 5,746,650 | A * | 5/1998 | Johnson | B05B 16/60 454/52 |
| 5,890,367 | A * | 4/1999 | You | F24F 3/167 62/78 |
| 6,059,866 | A * | 5/2000 | Yamagata | B01D 53/78 96/265 |
| 6,083,302 | A * | 7/2000 | Bauver, II | B01D 53/504 55/440 |
| 6,092,794 | A * | 7/2000 | Reens | B01F 23/2132 261/115 |
| 6,129,285 | A * | 10/2000 | Schafka | B05B 16/60 236/44 C |
| 6,565,625 | B2 * | 5/2003 | Hearld | B01D 50/20 96/417 |
| 6,770,121 | B1 * | 8/2004 | Sindel | B01D 45/08 55/440 |
| 7,291,196 | B1 * | 11/2007 | Lerner | B01D 46/003 264/DIG. 48 |
| 7,927,394 | B2 * | 4/2011 | MacKenzie | B01D 45/08 55/482 |
| 8,273,158 | B2 * | 9/2012 | Jarrier | B01D 46/62 55/482 |
| 8,349,043 | B2 * | 1/2013 | Jarrier | F02C 7/052 96/108 |
| 8,419,836 | B2 * | 4/2013 | Ardizzone | B01D 45/06 55/443 |
| 8,936,662 | B2 * | 1/2015 | Buzanowski | B01D 39/10 55/525 |
| 10,179,305 | B2 * | 1/2019 | Valsler | B01D 45/16 |
| 2008/0028935 | A1 * | 2/2008 | Andersson | F23J 15/022 95/272 |
| 2009/0071561 | A1 * | 3/2009 | Dalrymple | F15D 1/02 138/44 |
| 2012/0132075 | A1 * | 5/2012 | Jarrier | B01D 46/003 55/464 |
| 2015/0283492 | A1 * | 10/2015 | Holler | B05B 14/43 95/90 |
| 2017/0274410 | A1 * | 9/2017 | Shirahata | H01L 21/31 |
| 2017/0276386 | A1 * | 9/2017 | Ponyavin | F24F 13/20 |
| 2019/0283065 | A1 * | 9/2019 | Ishida | B05C 15/00 |
| 2023/0009492 | A1 * | 1/2023 | Qin | F24F 6/12 |

FOREIGN PATENT DOCUMENTS

| | | | | |
|---|---|---|---|---|
| CN | 112295332 A * | 2/2021 | | B01D 46/10 |
| JP | 55114368 A | 9/1980 | | |
| JP | 56136228 U | 10/1981 | | |
| JP | 57165063 A | 10/1982 | | |
| JP | 200453238 A | 2/2004 | | |
| JP | 2011127812 A | 6/2011 | | |
| JP | 2012122671 A | 6/2012 | | |
| JP | 2013245928 A | 12/2013 | | |
| JP | 2018162909 A | 10/2018 | | |
| JP | 2019072695 A | 5/2019 | | |
| WO | WO-2012069156 A2 * | 5/2012 | | B01D 41/04 |
| WO | WO-2014056933 A1 * | 4/2014 | | B01D 53/04 |
| WO | 2018108746 A1 | 6/2018 | | |
| WO | WO-2022136444 A1 * | 6/2022 | | B05D 14/43 |

* cited by examiner

AIR CONDITIONER FOR PAINT BOOTH

CROSS-REFERENCE TO RELATED APPLICATIONS

This application is the United States national phase of International Application No. PCT/JP2020/028873 filed Jul. 28, 2020, and claims priority to Japanese Patent Application No. 2019-143733 filed Aug. 5, 2019, the disclosures of which are hereby incorporated by reference in their entirety.

BACKGROUND OF THE INVENTION

Field of the Invention

The present invention relates to an air conditioner for supplying humidified air to a paint booth for painting a paint target.

Description of Related Art

Paint booths for painting various paint targets such as automobile bodies, automobile parts, and other ordinary paint targets are configured such that an air conditioner supplies air to the paint booth.

Because the air that the air conditioner supplies to the paint booth has an influence on the quality of the painting of the paint target, the temperature and humidity of the air need to be controlled.

In order to be able to control the temperature and humidity of the air, various means for heating and humidifying the air that is to be supplied to the paint booth are provided inside the housing of the air conditioner.

For example, Patent Document 1 discloses a paint booth air conditioner 1 (hereinafter, called the conventional air conditioner) in which a pre-heater 23, a humidifying means 24, a cooling coil 26, and a re-heater 27 are provided inside a housing in this order from the upstream side in the airflow direction of air that is to be supplied to a paint booth. Note that these reference numbers are the reference numbers used in Patent Document 1.

The humidifying means 24 includes a water storage unit 24a, a circulation pipe 24b, a pump 24c, a solenoid valve 24d, and a water spray unit 24e, and is configured to raise the humidity of outside air that has passed through the pre-heater 23 by spraying water into the outside air.

However, the conventional air conditioner is configured to spray a large amount of water from the water spray unit 24e provided in the humidifying means 24. The water sprayed from the humidifying means 24 has a large droplet size of around 440 μm. In order to raise the humidity of air with water in this way, it is necessary to ensure a certain duration of contact between the water and the air, thus requiring a long airflow path. Furthermore, in order to efficiently perform humidification with water that has a large droplet size, the nozzle arrangement of the water spray unit 24e and the routing of the circulation pipe 24b need to be taken into consideration.

Also, the pump 24c needs to have sufficient performance in order to be able to spray a large amount of water, which is a factor in a rise in the equipment cost and the running cost. Furthermore, it is necessary to provide a water tank for recovering sprayed water that is to be recirculated and a configuration for maintaining and managing the water quality of the water in the water tank, and space for such components needs to be provided inside the housing.

Also, unvaporized moisture in the air causes condensation to form on the downstream side of the humidifying means 24, and in order to avoid this, it is sometimes necessary to provide an eliminator that separates and collects unvaporized moisture from the air. However, if an eliminator is provided in the housing, the pressure loss inside the housing rises, and it is not possible to raise the airflow speed inside the housing. For this reason, the airflow cross-sectional area in the housing needs to be increased in order to sufficiently ensure the amount of air that is needed in the paint booth.

As described above, conventional air conditioners have room for improvement in terms of higher efficiency, lower energy consumption, and smaller size.

Furthermore, besides a configuration that uses a humidifying means, there are also configurations that use steam spray humidification as disclosed in Patent Document 2, humidification using a filler or the like as disclosed in Patent Document 3, atomization spraying that uses high pressure atomization as disclosed in Patent Document 4, and conventionally known dry mist humidification, for example.

However, steam spray humidification such as that disclosed in Patent Document 2 has problems such as high running cost due to high steam cost, high energy consumption due to poor steam energy efficiency, and the formation of condensation inside downstream devices due to localized supersaturation.

Humidification using a filler or the like such as that disclosed in Patent Document 3 has problems such as poor control response due to the retention of water in the filler, and the need for a large space for the humidifier portion due to needing to increase the air-liquid contact area for some types of fillers.

High pressure atomization spraying such as that disclosed in Patent Document 4 has problems such as not being able to reduce the size of the air conditioner if a water receiving tank is provided, and not being able to reduce the size of the air conditioner due to needing a certain distance to allow sprayed mist to vaporize downstream of the spray nozzle.

Conventionally known dry mist humidification has problems such as not being able to reduce the size of the air conditioner due to needing a certain distance to allow sprayed mist to vaporize downstream of the spray nozzle, being likely to have portions in the air where localized supersaturation occurs and the vaporization of sprayed mist is insufficient, and the likelihood of condensation forming inside downstream devices.

PATENT DOCUMENTS

Patent Document 1: JP 2013-245928A
Patent Document 2: JP 2011-127812A
Patent Document 3: JP 2018-162909A
Patent Document 4: WO 2018/108746

SUMMARY OF THE INVENTION

The present invention was achieved in light of the foregoing circumstances, and an object of the present invention is to provide an air conditioner that can have a higher efficiency, a lower power consumption, and a smaller size.

In order to achieve the above-described object, a characteristic configuration of an air conditioner according to an aspect of the present invention is an air conditioner for supplying air to a paint booth for painting a paint target, the air conditioner including: a housing having an inlet and an outlet for air that is to be supplied; a humidifying means for spraying humidifying mist into the air taken in through the inlet; and a vaporizing means for vaporizing unvaporized humidifying mist contained in the air into which the humidifying mist was sprayed by the humidifying means, by causing the unvaporized humidifying mist to come into contact with the air flowing through the vaporizing means, wherein the air subjected to humidity adjustment by the humidifying means and the vaporizing means is supplied to the paint booth via the outlet.

Note that the humidifying mist is a mist whose droplet size (100 µm or smaller, and preferably approximately 30 µm) is much smaller than the droplet size of water sprayed by a conventional humidifying means (approximately 440 µm).

Accordingly, the humidifying mist for humidifying the air that is to be supplied to the paint booth has a larger area of contact with the air, thus increasing the vaporization speed. For this reason, the airflow path inside the housing can be shorter than in a conventional air conditioner. According to the above configuration, with the air conditioner according to this aspect of the present invention, the size of the air conditioner in the airflow direction of the air flowing from the inlet toward the outlet can be approximately 10% smaller than that of a conventional air conditioner.

When performing humidification with the same amount of water, the smaller the droplet size of the water is, the larger the relative surface area is, thus enabling more efficient contact with the air. In other words, when raising the humidity by the same amount, the smaller the droplet size is, the smaller the required amount of water is. The air can be humidified efficiently and with good control response even when using the minimum amount of water required for humidification, thus making it possible to use a pump that uses less power, and making it possible to achieve a reduction in equipment cost and running cost.

According to the above configuration, with the air conditioner according to this aspect of the present invention, the power consumption of the pump can be approximately 90% lower than that in a conventional air conditioner. Also, because the air can be humidified efficiently and with good control response, the nozzles for spraying the humidifying mist can be arranged with more freedom, and the pipe connected to the nozzles can be routed more easily.

The vaporizing means provided downstream of the humidifying means traps unvaporized humidifying mist that was not vaporized by contact with the air and remains in the air in the form of droplets, and the vaporizing means promotes contact between the trapped humidifying mist and the air that flows through the vaporizing means. Accordingly, the unvaporized humidifying mist is sufficiently vaporized. Also, even if localized supersaturation occurs in portions of the air when the air is humidified by the humidifying means, the supersaturation becomes homogenized as the air flows through the vaporizing means, thus avoiding the risk of condensation forming downstream of the vaporizing means.

Accordingly, it is not necessary to provide a water tank and an eliminator inside the housing as in conventional air conditioners, thus eliminating the need to ensure space for such members. The air conditioner according to this aspect of the present invention does not need a water tank as described above, thus eliminating the expense of maintaining and managing the water quality in the water tank, which is necessary in conventional air conditioners.

As described above, it is possible to achieve a higher efficiency for humidification in the air conditioner, as well as a lower equipment cost and running cost, a lower power consumption, and a smaller size.

Also, the problems of steam spray humidification do not occur because steam spraying is not performed, the problems of humidification performed using a filler or the like do not occur because a filler or the like are not used, the problems of atomization spraying that uses high pressure atomization do not occur because high pressure atomization spraying is not used, and the problems of dry mist humidification do not occur because the vaporizing means is provided.

In the present invention, it is preferable that the vaporizing means includes a plurality of plate-shaped elements, and the elements are disposed separated from each other in a vertical direction, are each arranged in an inclined orientation such that a lower edge is upstream of an upper edge in an airflow direction of air flowing from the inlet toward the outlet, and are arranged such that the lower edge of an upper element out of a pair of vertically adjacent elements is lower than the upper edge of a lower element out of the pair of elements.

According to this configuration, it is possible to eliminate a direct airflow path from the inlet to the outlet between the upper element and the lower element, while also providing a sufficiently large airflow path between the vertically adjacent elements. For this reason, the amount of pressure loss that occurs when air flows through the vaporizing means is smaller than the amount of pressure loss caused by an eliminator provided in conventional air conditioners. Accordingly, a higher airflow speed than in a conventional air conditioner can be achieved without needing to increase the airflow cross-sectional area. According to the above configuration, with the air conditioner according to this aspect of the present invention, the airflow cross-sectional area for the air flowing from the inlet toward the outlet can be approximately 40% smaller in than a conventional air conditioner.

Also, a direct airflow path from the inlet to the outlet does not exist between the upper element and the lower element. This therefore reduces the risk of unvaporized humidifying mist reaching the outlet without coming into contact with any element.

In the present invention, it is preferable that the elements are each constituted by a porous body having pores that can trap the unvaporized humidifying mist contained in the air at surfaces of the pores while allowing the air to flow through.

According to the above configuration, when the air containing unvaporized humidifying mist flows over the surfaces of the porous bodies that constitute the elements and flows through the pores, the unvaporized humidifying mist collides with the pore surfaces due to the inertial force of the humidifying mist itself, and becomes trapped at the surfaces due to the electrostatic force of the humidifying mist and the porous body, for example. When the humidifying mist becomes trapped in the pores, contact with air passing through the pores is promoted at the pore surfaces, and therefore the humidifying mist becomes sufficiently vaporized. Note that in view of the ease of acquisition and processing, a ceramic board and a metal sintered body are examples of the porous body.

In the present invention, it is preferable that the air conditioner further includes a heating means for heating the air taken in via the inlet before the air reaches the humidifying means.

According to the above configuration, the air taken in through the inlet can be heated by the heating means so as to have an optimal temperature for humidification by the humidifying means. If the air that is to be taken into the housing does not have a constant temperature and the air taken in through the inlet does not have a constant temperature, it is necessary to make fine adjustments to the conditions of humidification performed by the humidifying means. In contrast, if the air is heated to a temperature that is suited to the conditions of humidification performed by the humidifying temperature, the humidifying means can efficiently perform humidification with constant humidification conditions.

In the present invention, it is preferable that the air conditioner further includes a temperature/humidity adjusting means for performing temperature and humidity adjustment on the air subjected to humidity adjustment by the humidifying means before the air is discharged from the outlet.

According to the above configuration, the air that was heated by the heating means and humidified by the humidifying means can be adjusted by the temperature/humidity adjusting means so as to have a temperature and humidity that are optimal for use in the paint booth.

Note that a cooling means and a heating means are examples of the temperature/humidity adjusting means, and either one may be provided, or both may be provided. In the latter case, it is preferable that the cooling means is provided upstream of the heating means in the airflow direction of the air.

DETAILED DESCRIPTION OF THE INVENTION

The following describes an embodiment of an air conditioner according to the present invention with reference to the drawings.

Figure 1:
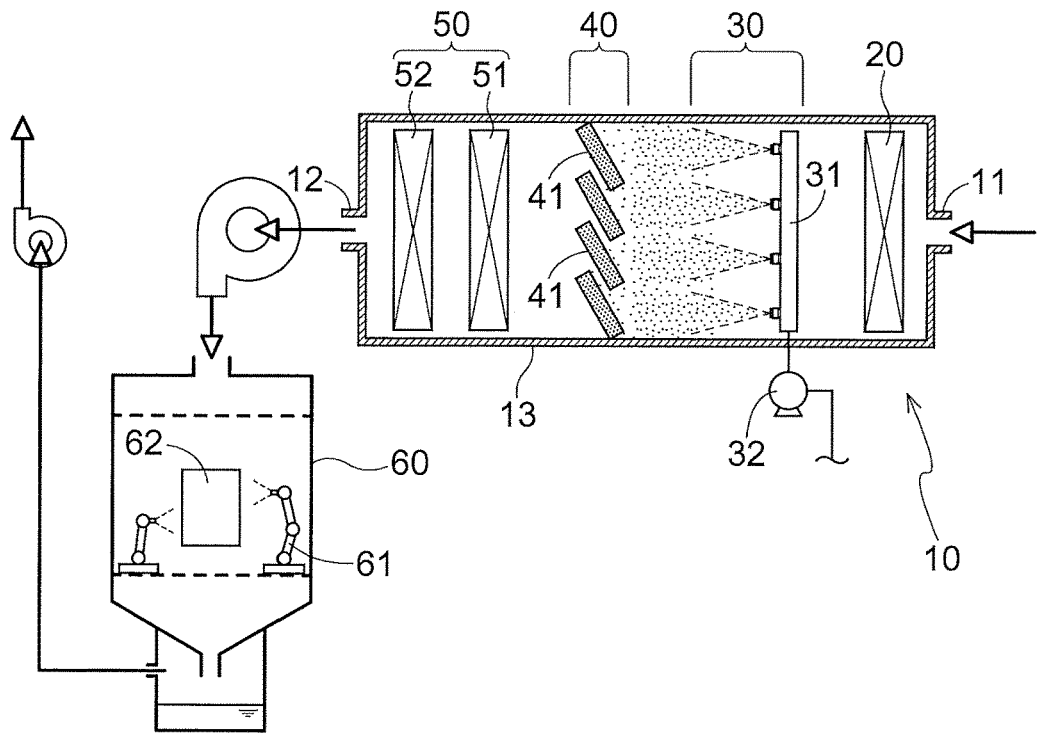
FIG. 1 is an illustrative diagram of an air conditioner according to the present invention.

As shown in FIG. 1, a paint booth 60 is for painting various paint targets such as automobile bodies, automobile parts, and other ordinary paint targets, and a paint target 62 is painted in the paint booth 60 by spraying paint from painting devices 61.

An air conditioner 10 supplies temperature/humidity controlled air to the paint booth 60 in order to ensure the quality of the painting of the paint target 62.

The supplied air also plays a role of trapping excess flying paint mist that has been sprayed from the painting devices 61.

The air conditioner 10 includes a heating means 20, a humidifying means 30, a vaporizing means 40, and a temperature/humidity adjusting means 50, which are provided inside a housing 13 that has an inlet 11 for air outside the air conditioner 10 and an outlet 12.

The heating means 20 is provided in order to heat air taken in via the inlet 11 to a temperature suited to humidification by the humidifying means 30.

The humidifying means 30 includes mist nozzles 31, a pump 32 for supplying water to the mist nozzles 31, and the like, and is configured to humidify the air whose temperature was adjusted by the heating means 20, by spraying water supplied by the pump 32 from the mist nozzles 31 so as to form a humidifying mist that has a droplet size of approximately 30 μm or smaller. The mist nozzles 31 are constituted by single-fluid high pressure nozzles. In the present embodiment, the mist nozzles 31 are arranged so as to spray the humidifying mist downstream in the airflow direction of the air.

The vaporizing means 40 includes multiple plate-shaped elements 41. The elements 41 are each constituted by a ceramic board, which is one example of a porous body. The pores in the ceramic board are smaller than the droplet size of the humidifying mist sprayed by the mist nozzles 31.

Figure 2:
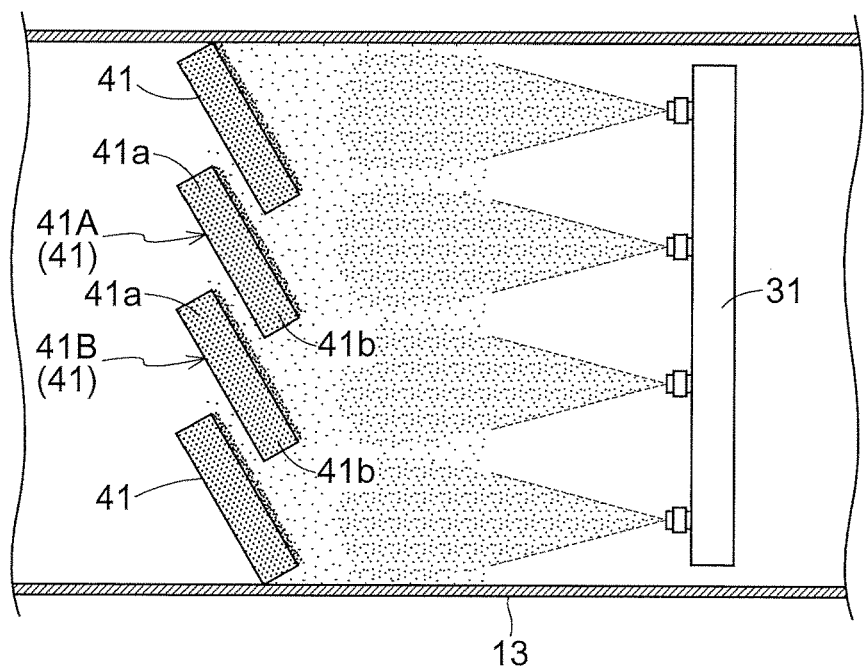
FIG. 2 is an illustrative diagram of a humidifying means and a vaporizing means.

As shown in FIG. 2, the elements 41 are disposed separated from each other in the vertical direction, and are each arranged in an inclined orientation such that a lower edge 41b is upstream of an upper edge 41a in the airflow direction of air flowing from the inlet 11 toward the outlet 12. In the present embodiment, the elements 41 are disposed such that the front and back surfaces form an angle of 60 degrees with the horizon, for example. The angle need only be in a range of approximately 45 to 85 degrees, and can be adjusted in accordance with the design wind speed of the air conditioner 10 so as to be able to reliably trap unvaporized humidifying mist and minimize pressure loss.

Also, the elements 41 are arranged such that, for each pair of elements 41 that are vertically adjacent (in FIG. 2, two elements are indicated by 41A and 41B to facilitate the description), the lower edge 41b of the upper element 41 (41A) is lower than the upper edge 41a of the lower element 41 (41B).

According to this configuration, a direct airflow path from the inlet 11 to the outlet 12 does not exist between the upper element 41 (41A) and the lower element 41 (41B), thus reducing the risk of unvaporized humidifying mist reaching the outlet 12 without coming into contact with any of the elements 41.

Because sufficiently large airflow paths can be provided between the pairs of elements 41 (41A and 41B) that are vertically adjacent among the elements 41, the amount of pressure loss that occurs as air flows through the vaporizing means 40 is lower than the amount of pressure loss caused by an eliminator provided in a conventional paint booth air conditioner. For this reason, a higher airflow speed than in a conventional paint booth air conditioner can be achieved without needing to increase the airflow cross-sectional area.

Figure 3:
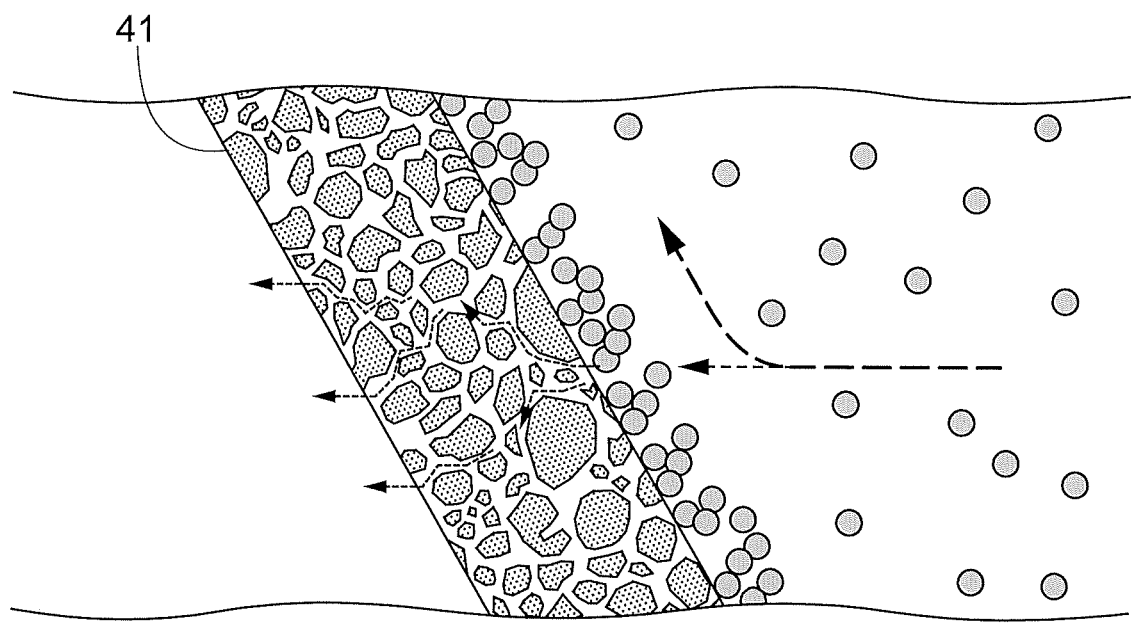
FIG. 3 is an illustrative diagram of a relevant portion of the air conditioner.

As shown by the flow indicated by a thick dashed-line arrow in FIG. 3, as the majority of the air that contains unvaporized humidifying mist flows through the airflow path between a pair of vertically adjacent elements 41 (41A and 41B) to the downstream side of the elements 41, the humidifying mist collides with the surface of the porous body that constitutes the element 41 due to the inertial force of the humidifying mist itself, and becomes trapped at the surface due to the electrostatic force of the humidifying mist and the porous body, for example. Note that in FIG. 3, the round bodies shown to the right of the element 41 are the humidifying mist, and it is shown that such round bodies are trapped at the surface of the element 41.

Also, as shown by the flow indicated by thin dashed-line arrows in FIG. 3, some of the air containing unvaporized humidifying mist passes through the pores of the porous body that constitutes the element 41, and as the air containing unvaporized humidifying mist passes through the pores of the porous body that constitutes the element 41, the unvaporized humidifying mist collides with the pore surfaces due to the inertial force of the humidifying mist itself, and becomes trapped at the surfaces due to the electrostatic force of the humidifying mist itself and the porous body, for example. When the humidifying mist becomes trapped at the pore surfaces, contact with air passing through the pores is promoted, and therefore the humidifying mist becomes sufficiently vaporized.

The temperature/humidity adjusting means 50 includes a cooling means 51 for cooling air that has passed through the vaporizing means 40, and a heating means 52 for heating the air that was cooled by the cooling means 51. The air humidified by the humidifying means 30 can be adjusted by the cooling means 51 and the heating means 52 so as to have a temperature and humidity that are optimal for used in the paint booth 60.

Although the case where the porous body that constitutes the elements 41 is a ceramic board is described in the above embodiment, there is no limitation this. For example, the porous body may be a metal sintered body, and it is sufficient that, at the surface of the porous body, unvaporized humidifying mist comes into contact with air passing through the pores of the porous body.

Although the case where the mist nozzles 31 are single-fluid high pressure nozzles is described in the above embodiment, there is no limitation to this. The mist nozzles 31 may be two-fluid nozzles, or may be ultrasonic atomizing nozzles.

Although the case where the air conditioner 10 includes the heating means 20, the humidifying means 30, the vaporizing means 40, and the temperature/humidity adjusting means 50 inside the housing 13 is described in the above embodiment, there is no limitation to this. The air conditioner 10 may have a configuration in which the heating means 20 and the temperature/humidity adjusting means 50 are not included inside the housing 13. In this case, the heating means 20 and the temperature/humidity adjusting means 50 may be provided outside the housing 13.

The embodiments described above are all examples of the present invention, the present invention is not limited to the above descriptions, and specific configurations of portions can be appropriately changed and designed while still achieving the effects of the present invention.

DESCRIPTION OF REFERENCE SIGNS

10: Air conditioner
11: Inlet
12: Outlet
13: Housing
20: Heater
30: Humidifier
31: Mist nozzle
40: Vaporizer
41: Element
41*a*: Upper edge
41*b*: Lower edge
50: Temperature/humidity adjuster
60: Paint booth
62: Paint target

The invention claimed is:

1. An air conditioning apparatus for supplying air to a paint booth for painting a paint target, the air conditioning apparatus comprising:

a housing having an outlet for supplying the air to the paint booth;
an inlet for taking the air in the housing;
a humidifier for spraying humidifying mist into the air taken from the inlet; and
a plurality of plate-shaped elements disposed between the humidifier and the outlet and disposed separated from each other in a vertical direction for vaporizing unvaporized humidifying mist,
wherein each of the plurality of plate-shaped elements is arranged in an orientation upwardly inclined in an airflow direction of air flowing from the inlet toward the outlet, and wherein a lower edge of an upper element out of a pair of vertically adjacent elements is lower than an upper edge of a lower element out of the pair of elements, and
wherein the air containing the unvaporized humidifying mist contacts the plurality of plate-shaped elements, and, as a result, the plurality of plate-shaped elements trap the unvaporized humidifying air.

2. The air conditioning apparatus according to claim 1, wherein each of the plurality of plate-shaped elements is inclined at an angle in a range of 45 to 85 degrees relative to a horizontal direction.

3. The air conditioning apparatus according to claim 2, wherein each of the plurality of plate-shaped elements is each constituted by a porous body having pores that can trap the unvaporized humidifying mist contained in the air while allowing the air to flow through.

4. The air conditioning apparatus according to claim 2, further comprising a heater disposed between the inlet and the humidifier for heating air.

5. The air conditioning apparatus according to claim 2, further comprising a cooler configured to cool air that has passed through the plurality of plate-shaped elements and a heater configured to heat air that is cooled by the cooler.

6. The air conditioning apparatus according to claim 1, wherein each of the plurality of plate-shaped elements is each constituted by a porous body having pores that can trap the unvaporized humidifying mist contained in the air while allowing the air to flow through.

7. The air conditioning apparatus according to claim 6, further comprising a heater disposed between the inlet and the humidifier for heating air.

8. The air conditioning apparatus according to claim 6, further comprising a cooler configured to cool air that has passed through the plurality of plate-shaped elements and a heater configured to heat air that is cooled by the cooler.

9. The air conditioning apparatus according to claim 6, further comprising a heater disposed between the inlet and the humidifier for heating air.

10. The air conditioning apparatus according to claim 9, further comprising a cooler configured to cool air that has passed through the plurality of plate-shaped elements and a heater configured to heat air that is cooled by the cooler.

11. The air conditioning apparatus according to claim 1, further comprising cooler configured to cool the air that has passed through the plurality of plate-shaped elements and a heater configured to heat the air that is cooled by the cooler.

* * * * *

UNITED STATES PATENT AND TRADEMARK OFFICE
CERTIFICATE OF CORRECTION

PATENT NO. : 12,270,570 B2
APPLICATION NO. : 17/272480
DATED : April 8, 2025
INVENTOR(S) : Kozo Ishida et al.

It is certified that error appears in the above-identified patent and that said Letters Patent is hereby corrected as shown below:

In the Claims

Column 8, Line 48, Claim 9, delete "6," and insert -- 1, --

Column 8, Line 56, Claim 11, after "comprising" insert -- a --

Signed and Sealed this
Twenty-ninth Day of July, 2025

Coke Morgan Stewart
*Acting Director of the United States Patent and Trademark Office*